US012742061B2

(12) United States Patent
Sawaki et al.

(10) Patent No.: US 12,742,061 B2

(45) Date of Patent: Sep. 22, 2026

(54) ELASTOMER COMPOSITION AND TIRE

(71) Applicant: SUMITOMO RUBBER INDUSTRIES, LTD., Hyogo (JP)

(72) Inventors: Haruko Sawaki, Hyogo (JP); Tomohiro Akahori, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 18/035,650

(22) PCT Filed: Nov. 1, 2021

(86) PCT No.: PCT/JP2021/040277

§ 371 (c)(1),
(2) Date: May 5, 2023

(87) PCT Pub. No.: WO2022/102459

PCT Pub. Date: May 19, 2022

(65) Prior Publication Data

US 2024/0010821 A1 Jan. 11, 2024

(30) Foreign Application Priority Data

Nov. 11, 2020 (JP) ................................ 2020-187836

(51) Int. Cl.
*B60C 1/00* (2006.01)
*B60C 11/00* (2006.01)
*C08L 9/06* (2006.01)

(52) U.S. Cl.
CPC .............. *C08L 9/06* (2013.01); *B60C 1/0016* (2013.01); *B60C 11/0008* (2013.01); *B60C 11/005* (2013.01); *B60C 2011/0033* (2013.01); *C08L 2205/16* (2013.01)

(58) Field of Classification Search
CPC .......... C08L 9/06; B60C 11/00; B60C 11/005; B60C 2011/0033
See application file for complete search history.

(56) References Cited

U.S. PATENT DOCUMENTS 8,415,432 B1 * 4/2013 Mruk ...................... C08L 21/00 525/240
2013/0068358 A1 * 3/2013 Shinkai ................... B60C 15/00 156/117
2013/0165579 A1 6/2013 Mruk et al.
2013/0165587 A1 6/2013 Mruk et al.
2013/0165588 A1 6/2013 Mruk et al.
2014/0148551 A1 5/2014 Hermann et al.
2014/0148554 A1 5/2014 Ma et al.
2022/0306777 A1 * 9/2022 Nakahata .................. C08L 7/00

FOREIGN PATENT DOCUMENTS

CN 103172808 A 6/2013
EP 2 735 451 A1 5/2014
JP H02167353 A * 6/1990
JP H05-112674 A 5/1993
JP 2001-123018 A 5/2001
JP 2003127613 A * 5/2003 ........... B60C 11/005
JP 2008-214377 A 9/2008
JP 2010-077257 A 4/2010
JP 2013-515108 A 5/2013
JP 2018-030973 A 3/2018
JP 2019-214654 A 12/2019
JP 2019-161312 A 10/2021
WO WO-9858810 A1 * 12/1998 ............. B60C 11/00
WO 2011/079922 A1 7/2011
WO WO-2020002439 A1 * 1/2020 .............. C08L 33/26
WO WO-2020230606 A1 * 11/2020 ................ C08L 7/00

OTHER PUBLICATIONS

"Sridhar, Sanjeevi; et al,"Temperature Responsive Poly(N-isopropylacrylamide-block-styrene) Block Copolymer Coatings with Tunable Hydrophilicity Available OnlineNov. 7, 2020 "Surfaces and Interfaces". https://www.sciencedirect.com/science/article/pii/S2468023020307926 (Year: 2020).*
ISR issued in International Patent Application No. PCT/JP2021/040277, Dec. 21, 2021, translation.
IPRP issued in International Patent Application No. PCT/JP2021/040277, May 16, 2021, translation.

* cited by examiner

*Primary Examiner* — Justin R Fischer
*Assistant Examiner* — Thomas Frank Schneider
(74) *Attorney, Agent, or Firm* — GREENBLUM & BERNSTEIN, P.L.C.

(57) ABSTRACT

An elastomer composition containing a styrene-based elastomer, and a temperature-responsive resin that changes its hydrophilicity with changes in temperature, the elastomer composition satisfying the following relationship at two given temperatures differing by at least 10° C.: (Contact angle at lower temperature)/(Contact angle at higher temperature)≤0.90, the lower temperature being lower than 25° C.

8 Claims, No Drawings

ELASTOMER COMPOSITION AND TIRE

TECHNICAL FIELD

The present disclosure relates to an elastomer composition and a tire.

BACKGROUND ART

Tires with various desirable properties have been desired (see, for example, Patent Literature 1).

CITATION LIST

Patent Literature

Patent Literature 1: JP 2008-214377 A

SUMMARY OF DISCLOSURE

Technical Problem

It is desirable, particularly for all-season tires, among other tires, to change tire performance according to large changes in external temperature or road surface conditions.

To date, however, the tire industry has not much focused on changing tire performance in response to changes in temperature. Conventional techniques have room for improvement in terms of changing tire performance in response to changes in temperature.

The present disclosure aims to solve the above problem and provide an elastomer composition and a tire capable of changing tire performance in response to changes in temperature.

Solution to Problem

The present disclosure relates to an elastomer composition, containing: a styrene-based elastomer; and a temperature-responsive resin that changes its hydrophilicity with changes in temperature, the elastomer composition satisfying the following relationship at two given temperatures differing by at least 10° C.:

(Contact angle at lower temperature)/(Contact angle at higher temperature)≤0.90, the lower temperature being lower than 25° C.

Advantageous Effects of Disclosure

The elastomer composition according to the present disclosure contains a styrene-based elastomer, and a temperature-responsive resin that changes its hydrophilicity with changes in temperature. Further, the elastomer composition satisfying the following relationship at two given temperatures differing by at least 10° C.: (Contact angle at lower temperature)/(Contact angle at higher temperature)≤0.90, and the lower temperature is lower than 25° C. Such an elastomer composition is capable of changing tire performance in response to changes in temperature.

DESCRIPTION OF EMBODIMENTS

The elastomer composition of the present disclosure contains a styrene-based elastomer, and a temperature-responsive resin that changes its hydrophilicity with changes in temperature. The elastomer composition also satisfies the following relationship at two given temperatures differing by at least 10° C.: (Contact angle at lower temperature)/(Contact angle at higher temperature)≤0.90, and the lower temperature is lower than 25° C. Thus, the elastomer composition is capable of changing tire performance in response to changes in temperature.

The elastomer composition provides the above-mentioned effect. The reason for such an advantageous effect is not exactly clear but is believed to be as follows.

The relationship: (Contact angle at lower temperature)/(Contact angle at higher temperature)≤0.90 means that the elastomer composition has a smaller contact angle (i.e., is more hydrophilic) at low temperatures than at high temperatures, and that the elastomer composition has a larger contact angle (i.e., is more hydrophobic) at high temperatures than at low temperatures. Accordingly, the elastomer composition changes its hydrophilicity with changes in temperature, and thus is capable of changing tire performance in response to changes in temperature.

The elastomer composition having such properties can be achieved by containing a temperature-responsive resin that changes its hydrophilicity with changes in temperature. Specifically, as the temperature-responsive resin changes its hydrophilicity with changes in temperature, the resin may be incorporated to provide an elastomer composition having the above properties.

Here, an elastomer composition which does not contain a temperature-responsive resin but contains a temperature-responsive polymer as described later cannot reversibly change tire performance in response to changes in temperature because the temperature-responsive polymer has a low compatibility with elastomers and also because the temperature-responsive polymer may dissolve in water or otherwise run off the elastomer composition, e.g., in rainy weather. In contrast, an elastomer composition containing a temperature-responsive resin can reversibly change tire performance in response to changes in temperature because the temperature-responsive resin has a relatively high compatibility with elastomers and also because the temperature-responsive resin will not dissolve in water or otherwise run off the elastomer composition.

Thus, the present disclosure solves the problem (purpose) of changing tire performance in response to changes in temperature by formulating an elastomer composition which contains a styrene-based elastomer and a temperature-responsive resin that changes its hydrophilicity with changes in temperature and which satisfies the above contact angle parameter. In other words, the parameter does not define the problem (purpose), and the problem herein is to change tire performance in response to changes in temperature. In order to solve this problem, an elastomer composition has been formulated to contain a styrene-based elastomer and a temperature-responsive resin that changes its hydrophilicity with changes in temperature and to satisfy the contact angle parameter. Thus, it is an essential requirement to satisfy the contact angle parameter.

In particular, when the temperature-responsive resin shows a lower critical solution temperature (LCST) in water, the temperature-responsive resin shows hydrophobicity at temperatures higher than the LCST and shows hydrophilicity at temperatures lower than the LCST.

Accordingly, at high temperatures, for example, at 60° C., the temperature-responsive resin is hydrophobic and thus has an improved compatibility with the styrene-based elastomer. Therefore, good dry grip performance can be obtained.

On the other hand, at low temperatures, for example, on ice, the temperature-responsive resin is hydrophilic and thus is incompatible with the styrene-based elastomer; further, the presence of the hydrophilic temperature-responsive resin makes the elastomer surface hydrophilic.

The incompatibility reduces the glass transition temperature and the complex modulus, thereby improving ice grip performance.

Moreover, due to the hydrophilic elastomer surface (lower contact angle), the water present in a water film on an iced road surface (also referred to as icy road surface) can be suitably removed, resulting in improved ice grip performance.

Moreover, at high temperatures, for example, at 60° C., the temperature-responsive resin shows hydrophobicity and attracts plasticizers to its surroundings, while at low temperatures, for example, at 0° C., the temperature-responsive resin shows hydrophilicity and can easily release plasticizers into the matrix elastomer, so that the concentration of plasticizers in the matrix elastomer is increased and the elastomer composition has a lower complex modulus and improved ice grip performance.

As discussed above, when exposed to low temperatures on an iced road surface, the elastomer composition shows a high removal of water due to the lower contact angle, reductions in glass transition temperature and complex modulus due to the incompatibility (phase separation), and a reduction in complex modulus due to the release of plasticizers into the matrix elastomer, resulting in improved ice grip performance.

Accordingly, the elastomer composition provides good ice grip performance and also has excellent overall performance in terms of ice grip performance and dry grip performance.

The elastomer composition satisfies the following relationship at two given temperatures differing by at least 10° C.:

(Contact angle at lower temperature)/(Contact angle at higher temperature)≤0.90, and the lower temperature is lower than 25° C.

Preferably, the elastomer composition reversibly satisfies the relationship at two temperatures differing by at least 10° C. Herein, the phrase “reversibly satisfy the relationship” means that the temperature dependence of the contact angle satisfies the relationship at two temperatures differing by at least 10° C., even when it is subjected to repeated changes in temperature or is contacted with water.

Moreover, herein, the contact angle is measured as described in EXAMPLES.

Herein, the contact angle of the elastomer composition means the contact angle of the vulcanized (crosslinked) elastomer composition.

The two given temperatures differing by at least 10° C. are not limited as long as the lower temperature is lower than 25° C. The two temperatures may each be any temperature within the service temperature range of a tire, preferably within the range of −80° C. to 80° C. The lower limit of the temperature range is more preferably −50° C. or higher, still more preferably −20° C. or higher. The upper limit of the temperature range is more preferably 80° C. or lower, still more preferably 60° C. or lower.

For example, the two temperatures differing by at least 10° C. may be 5° C. and 60° C.

The lower temperature is lower than 25° C., preferably 15° C. or lower, more preferably 10° C. or lower, but is preferably 0° C. or higher, more preferably 1° C. or higher, still more preferably 2° C. or higher.

The contact angle as used herein usually refers to the contact angle of water, but may be the contact angle of an antifreeze when measured at a temperature of 0° C. or lower.

Herein, the term “antifreeze” refers to a liquid consisting of methanol and water which may be prepared by mixing water with methanol in an amount of 9 times the volume of the water at 25° C. for 30 minutes.

The ratio of (Contact angle at lower temperature)/(Contact angle at higher temperature) is 0.90 or less, preferably 0.85 or less, more preferably 0.80 or less, still more preferably 0.77 or less, particularly preferably 0.75 or less, most preferably 0.70 or less, even most preferably 0.68 or less, further most preferably 0.65 or less, particularly most preferably 0.64 or less, still further most preferably 0.62 or less. The lower limit is not limited, but is preferably 0.30 or more, more preferably 0.40 or more, still more preferably 0.50 or more, particularly preferably 0.60 or more. When the ratio is within the range indicated above, the advantageous effect tends to be more suitably achieved.

The contact angle (°) at the lower temperature is preferably 20 or larger, more preferably 30 or larger, still more preferably 40 or larger, particularly preferably 50 or larger, but is preferably 80 or smaller, more preferably 75 or smaller, still more preferably 70 or smaller, particularly preferably 65 or smaller, most preferably 60 or smaller. When the contact angle is within the range indicated above, the advantageous effect tends to be more suitably achieved.

Next, production guidelines for satisfying the contact angle parameter and the contact angle at the lower temperature are described.

The relationship: (Contact angle at lower temperature)/(Contact angle at higher temperature)≤0.90 means that the elastomer composition has a smaller contact angle (i.e., is more hydrophilic) at low temperatures than at high temperatures, and that the elastomer composition has a larger contact angle (i.e., is more hydrophobic) at high temperatures than at low temperatures. The elastomer composition having such properties can be achieved by containing a temperature-responsive resin that changes its hydrophilicity with changes in temperature.

The contact angle at the lower temperature being within the above-mentioned range means that the elastomer composition has a smaller contact angle (i.e., is more hydrophilic). The elastomer composition having such properties can be achieved by containing a temperature-responsive resin that changes its hydrophilicity with changes in temperature.

Specifically, the rubber having such properties can be produced by using a temperature-responsive resin that shows a lower critical solution temperature (LCST) in water.

Here, the contact angle (absolute value) can be controlled by the types and amounts of chemicals (in particular, rubber components, fillers, plasticizers, silane coupling agents) incorporated in the composition. For example, the contact angle tends to decrease when the amount of hydrophilic materials (for example, silica) is increased, while the contact angle tends to increase when the amount of hydrophilic materials is reduced. Moreover, the contact angle tends to increase when the amount of hydrophobic materials is increased, while the contact angle tends to decrease when the amount of hydrophobic materials is reduced.

Chemicals that may be used in the elastomer composition are described below.

The elastomer composition contains a styrene-based elastomer.

The styrene-based elastomer may be any elastomer having a styrene-based unit. Examples include styrene-butadiene rubbers (SBR), styrene-isoprene-butadiene rubbers (SIBR), styrene-based thermoplastic elastomers, styrene-isobutylene-styrene block copolymers (SIBS), styrene-isoprene-styrene block copolymers (SIS), styrene-isobutylene block copolymers (SIB), styrene-butadiene-styrene block copolymers (SBS), styrene-ethylene/butene-styrene block copolymers (SEBS), styrene-ethylene/propylene-styrene block copolymers (SEPS), styrene-ethylene/ethylene/propylene-styrene block copolymers (SEEPS), and styrene-butadiene/butylene-styrene block copolymers (SBBS). These may be used alone or in combinations of two or more. SBR is preferred among these because the advantageous effect can be more suitably achieved.

Here, an elastomer component (preferably a rubber component) preferably refers to a polymer (rubber) having a weight average molecular weight (Mw) of 200,000 or more, more preferably 350,000 or more. The upper limit of the Mw is not limited, but is preferably 4,000,000 or less, more preferably 3,000,000 or less.

Herein, the Mw and number average molecular weight (Mn) can be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

The amount of diene rubbers based on 100% by mass of the elastomer component content (preferably based on 100% by mass of the rubber component content) is preferably 20% by mass or more, more preferably 50% by mass or more, still more preferably 70% by mass or more, particularly preferably 80% by mass or more, most preferably 90% by mass or more, and may be 100% by mass. When the amount is within the range indicated above, the advantageous effect tends to be better achieved.

Elastomer components may include unmodified or modified polymers.

The modified polymers may be any polymer (preferably any diene rubber) having a functional group interactive with a filler such as silica. Examples include a chain end-modified polymer obtained by modifying at least one chain end of a polymer by a compound (modifier) having the functional group (i.e., a chain end-modified polymer terminated with the functional group); a backbone-modified polymer having the functional group in the backbone; a backbone- and chain end-modified polymer having the functional group in both the backbone and chain end (e.g., a backbone- and chain end-modified polymer in which the backbone has the functional group and at least one chain end is modified by the modifier); and a chain end-modified polymer into which a hydroxy or epoxy group has been introduced by modification (coupling) with a polyfunctional compound having two or more epoxy groups in the molecule.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxy, oxy, and epoxy groups. Here, these functional groups may be substituted. Preferred among these are amino groups (preferably amino groups whose hydrogen atom is replaced with a C1-C6 alkyl group), alkoxy groups (preferably C1-C6 alkoxy groups), and alkoxysilyl groups (preferably C1-C6 alkoxysilyl groups).

Any SBR may be used. Examples include emulsion-polymerized styrene-butadiene rubbers (E-SBR) and solution-polymerized styrene-butadiene rubbers (S-SBR). These may be used alone or in combinations of two or more.

The styrene content of the SBR is preferably 5% by mass or higher, more preferably 10% by mass or higher, still more preferably 15% by mass or higher, particularly preferably 20% by mass or higher. The styrene content is also preferably 60% by mass or lower, more preferably 50% by mass or lower, still more preferably 40% by mass or lower, particularly preferably 30% by mass or lower. When the styrene content is within the range indicated above, the advantageous effect tends to be better achieved.

Herein, the styrene content of the SBR can be determined by $^{1}$H-NMR analysis.

SBR products manufactured or sold by Sumitomo Chemical Co., Ltd., JSR Corporation, Asahi Kasei Corporation, Zeon Corporation, etc. may be used as the SBR.

The SBR may be either unmodified or modified SBR. Examples of the modified SBR include those into which functional groups as listed for the modified polymers have been introduced.

The amount of styrene-based elastomers (preferably SBR) based on 100% by mass of the elastomer component content (preferably based on 100% by mass of the rubber component content) is preferably 10% by mass or more, more preferably 20% by mass or more, still more preferably 40% by mass or more, particularly preferably 50% by mass or more. The amount may be 100% by mass, but is preferably 90% by mass or less, more preferably 70% by mass or less. When the amount is within the range indicated above, the advantageous effect tends to be better achieved.

Usable elastomers other than styrene-based elastomers are not limited. Examples include diene rubbers commonly used as rubber components in tire compositions, such as isoprene-based rubbers, polybutadiene rubbers (BR), ethylene-propylene-diene rubbers (EPDM), chloroprene rubbers (CR), and acrylonitrile-butadiene rubbers (NBR); acrylic rubbers such as butyl acrylate rubbers, ethyl acrylate rubbers, and octyl acrylate rubbers; nitrile rubbers, isobutylene rubbers, methyl methacrylate-butyl acrylate block copolymers, ethylene-propylene copolymers (EPR), chlorosulfonated polyethylenes, silicone rubbers (millable type, room temperature vulcanizing type), butyl rubbers, fluororubbers, olefin-based thermoplastic elastomers, vinyl chloride-based thermoplastic elastomers, urethane-based thermoplastic elastomers, polyamide-based thermoplastic elastomers, polyester-based thermoplastic elastomers, and fluorine-based thermoplastic elastomers. These may be used alone or in combinations of two or more. Diene rubbers are preferred among these, with BR being more preferred.

Any BR may be used. Examples include high-cis BR having a high cis content, BR containing syndiotactic polybutadiene crystals, and BR synthesized using rare earth catalysts (rare earth-catalyzed BR). These may be used alone or in combinations of two or more. In particular, high-cis BR having a cis content of 90% by mass or higher is preferred in order to improve abrasion resistance. Here, the cis content can be measured by infrared absorption spectrometry.

Moreover, the BR may be either unmodified or modified BR. Examples of the modified BR include those into which functional groups as listed for the modified polymers have been introduced.

Examples of commercial BR include those available from Ube Industries, Ltd., JSR Corporation, Asahi Kasei Corporation, Zeon Corporation, etc.

The amount of BR based on 100% by mass of the elastomer component content (preferably based on 100% by mass of the rubber component content) is preferably 5% by mass or more, more preferably 8% by mass or more, still more preferably 10% by mass or more, particularly preferably 30% by mass or more, but is preferably 80% by mass or less, more preferably 60% by mass or less. When the amount is within the range indicated above, the advantageous effect tends to be better achieved.

Examples of isoprene-based rubbers include natural rubbers (NR), polyisoprene rubbers (IR), refined NR, modified NR, and modified IR. Examples of NR include those commonly used in the tire industry such as SIR20, RSS #3, and TSR20. Any IR may be used, including for example those commonly used in the tire industry such as IR2200. Examples of refined NR include deproteinized natural rubbers (DPNR) and highly purified natural rubbers (UPNR). Examples of modified NR include epoxidized natural rubbers (ENR), hydrogenated natural rubbers (HNR), and grafted natural rubbers. Examples of modified IR include epoxidized polyisoprene rubbers, hydrogenated polyisoprene rubbers, and grafted polyisoprene rubbers. These may be used alone or in combinations of two or more. NR is preferred among these.

The elastomer composition contains a temperature-responsive resin that changes its hydrophilicity with changes in temperature.

The temperature-responsive resin that changes its hydrophilicity with changes in temperature is not limited as long as it changes its hydrophilicity with changes in temperature. Any temperature-responsive resin containing a group ("A" described later) that changes its hydrophilicity with changes in temperature may be used.

Herein, the term "resin" refers to an organic compound that is solid at 0° C. or higher, or specifically, an organic compound a part of which does not follow the shape of a container different from the shape of the organic compound, even when it is allowed to stand still for one minute in the container. Moreover, the term "resin" does not include the above-mentioned styrene-based elastomers.

The temperature-responsive resin is preferably a compound including "A" and "B" bound to each other. Here, "A" contains a group that changes its hydrophilicity with changes in temperature, and "B" includes at least one selected from the group consisting of terpene resins, rosin resins, styrene resins, C5 resins, C9 resins, C5/C9 resins, coumarone resins, indene resins, and olefin resins. Since "A" is bound to "B", dissolution of "A" (the group that changes its hydrophilicity with changes in temperature) in water can be inhibited. Thus, it is possible to reversibly change tire performance in response to changes in temperature.

First, "A" is described.

Herein, the group that changes its hydrophilicity with changes in temperature may be any group that changes its hydrophilicity with changes in temperature, preferably a group that reversibly changes its hydrophilicity with changes in temperature.

The group that reversibly changes its hydrophilicity with changes in temperature may be a temperature-responsive polymer (temperature-responsive polymer group). In other words, "A" containing a group that changes its hydrophilicity with changes in temperature may mean "A" containing a group formed of a temperature-responsive polymer, for example. Examples of such "A" include "A" grafted with temperature-responsive polymers, "A" containing temperature-responsive polymer units in the backbone, and "A" containing temperature-responsive polymer blocks in the backbone. These may be used alone or in combinations of two or more. In particular, it is preferred that "A" is a temperature-responsive polymer (i.e., "A" includes a temperature-responsive polymer).

The term "temperature-responsive polymer" refers to a material which in water undergoes reversible changes in the conformation of the polymer chains associated with hydration and dehydration in response to changes in temperature, and thus reversibly changes its hydrophilicity and hydrophobicity with changes in temperature. Such reversible changes are known to be caused by a molecular structure containing in a molecule a hydrophilic group capable of forming a hydrogen bond and a hydrophobic group hardly compatible with water.

Then, the present disclosers have found that a temperature-responsive polymer, not only when in water but also when in a composition containing resins and/or elastomers, exhibits reversible changes in hydrophilicity and hydrophobicity with changes in temperature.

Known temperature-responsive polymers include polymers that show a lower critical solution temperature (LCST, also known as lower critical consolute temperature or lower critical dissolution temperature) in water and polymers that show an upper critical solution temperature (UCST, also known as upper critical consolute temperature or upper critical dissolution temperature) in water. These may be used alone or in combinations of two or more.

The polymers that show a LCST become hydrophobic at temperatures higher than the LCST boundary as the intramolecular or intermolecular hydrophobic interaction becomes stronger to cause aggregation of the polymer chains. On the other hand, at temperatures lower than the LCST, they become hydrophilic as the polymer chains are hydrated by binding with water molecules. Thus, the polymers show a reversible phase transition behavior around the LCST.

In contrast, the polymers that show a UCST become hydrophobic and insoluble at temperatures lower than the UCST, while they become hydrophilic and soluble at temperatures higher than the UCST. Thus, the polymers show a reversible phase transition behavior around the UCST. The reason for such a UCST-type behavior is thought to be that intermolecular force can be driven by the hydrogen bonds between the side chains having a plurality of amide groups.

When the group that reversibly changes its hydrophilicity with changes in temperature is a polymer that shows a LCST, temperature changes can cause the polymer to become incompatible with other components in the composition, so that the glass transition temperature can be changed. Thus, it is possible to change tire performance (e.g., dry grip performance, ice grip performance) in response to changes in temperature.

In "A", the group that reversibly changes its hydrophilicity with changes in temperature is preferably a polymer that shows a LCST. In other words, the group that changes its hydrophilicity with changes in temperature is preferably a group that shows a lower critical solution temperature in water.

Herein, the group that shows a lower critical solution temperature (LCST) in water refers to a group which is present in "A" or in a temperature-responsive resin and which shows a lower critical solution temperature in water when the group is cleaved from "A" or from the temperature-responsive resin and the cleaved group (polymer) is introduced into water.

Likewise, herein, the group that shows an upper critical solution temperature (UCST) in water refers to a group which is present in "A" or in a temperature-responsive resin and which shows an upper critical solution temperature in water when the group is cleaved from "A" or from the temperature-responsive resin and the cleaved group (polymer) is introduced into water.

The group (polymer) that shows a LCST is described below.

The group (polymer) that shows a LCST may include a single group (polymer) or a combination of two or more groups (polymers).

The group (polymer) that shows a LCST may be any group (polymer) that shows a LCST. Preferred are poly(N-substituted (meth)acrylamides), among which groups represented by the following formula (I) are preferred:

(I)

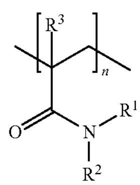

wherein n represents an integer of 1 to 1000; and $R^1$, $R^2$, and $R^3$ each independently represent a hydrogen atom or a hydrocarbyl group, provided that at least one of $R^1$ or $R^2$ is not a hydrogen atom, and $R^1$ and $R^2$ together may form a ring structure.

Preferably, n is 3 or larger, more preferably 5 or larger, still more preferably 10 or larger, particularly preferably 20 or larger, but is preferably 500 or smaller, more preferably 300 or smaller, still more preferably 150 or smaller, particularly preferably 80 or smaller, most preferably 40 or smaller, further most preferably 30 or smaller. When n is within the range indicated above, the advantageous effect tends to be better achieved.

The hydrocarbyl group for $R^1$ and $R^2$ may have any number of carbon atoms. The number of carbon atoms is preferably 1 or larger, more preferably 2 or larger, still more preferably 3 or larger, but is preferably 20 or smaller, more preferably 18 or smaller, still more preferably 14 or smaller, particularly preferably 10 or smaller, most preferably 6 or smaller, further most preferably 4 or smaller. When the number of carbon atoms is within the range indicated above, the advantageous effect tends to be better achieved.

Examples of the hydrocarbyl group for $R^1$ and $R^2$ include alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and aryl groups such as methylphenyl and ethylphenyl groups. Alkyl and cycloalkyl groups are preferred among these, with alkyl groups being more preferred.

The number of carbon atoms of the ring structure formed by $R^1$ and $R^2$ is preferably 3 or larger, more preferably 4 or larger, but is preferably 7 or smaller, more preferably 5 or smaller. When the number of carbon atoms is within the range indicated above, the advantageous effect tends to be better achieved.

The hydrocarbyl group for $R^1$ and $R^2$ may be branched or unbranched, preferably branched.

Preferably, $R^1$ and $R^2$ are each a hydrogen atom, an alkyl group (in particular, a branched alkyl group), or a cycloalkyl group, or $R^1$ and $R^2$ together form a ring structure. More preferably, $R^1$ and $R^2$ are any of the combinations shown in Table 1, still more preferably a combination of a hydrogen atom and an alkyl group (in particular, a branched alkyl group), particularly preferably a combination of a hydrogen atom and a propyl group (in particular, an isopropyl group).

TABLE 1

Chemical structure of preferred poly (N-substituted acrylamides), LCST

| $—NR^1R^2$ | Activation temperature [LCST] (° C.) |
|---|---|
| $NH—CH_2—CH_3$ | 82 |
| $NH—CH_2—CH_2—CH_3$ | 22 |
| $NH—CH—(CH_3)_2$ | 32-34 |
| $N\ (CH_3)\ (CH_2—CH_3)$ | 56 |
| $N\ (CH_2—CH_3)_2$ | 32-42 |
| $N\ (CH_2—(CH_3)_2)\ (CH_3)$ | 25 |
| 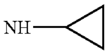 | 47 |
| 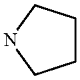 | 55 |
| 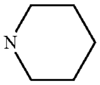 | 4 |

The hydrocarbyl group for $R^3$ may have any number of carbon atoms. The number of carbon atoms is preferably 1 or larger, but is preferably 5 or smaller, more preferably 3 or smaller, still more preferably 2 or smaller, particularly preferably 1. When the number of carbon atoms is within the range indicated above, the advantageous effect tends to be better achieved.

Examples of the hydrocarbyl group for $R^3$ include those listed for the hydrocarbyl group for $R^1$ and $R^2$. Alkyl groups are preferred among these.

The hydrocarbyl group for $R^3$ may be branched or unbranched.

$R^3$ is preferably a hydrogen atom or an alkyl group, more preferably a hydrogen atom.

Examples of the groups of formula (I) include: poly(N-alkylacrylamide) polymers such as poly(N-isopropylacrylamide), poly(N-ethylacrylamide), poly(N-n-propylacrylamide), poly(N-ethyl,N-methylacrylamide), poly(N,N-diethylacrylamide), poly(N-isopropyl,N-methylacrylamide), poly(N-cyclopropylacrylamide), poly (N-acryloylpyrrolidine), and poly(N-acryloylpiperidine); and poly(N-alkylmethacrylamide) polymers such as poly(N-isopropylmethacrylamide), poly(N-ethylmethacrylamide), poly(N-n-propylmethacrylamide), poly(N-ethyl,N-methylmethacrylamide), poly(N,N-diethylmethacrylamide), poly (N-isopropyl,N-methylmethacrylamide), poly(N-cyclopropylmethacrylamide), poly(N-methacryloylpyrrolidine), and poly(N-methacryloylpiperidine). These may be used alone or in combinations of two or more. Poly(N-isopropylacrylamide) and poly(N,N-diethylacrylamide) are preferred among these, with poly(N-isopropylacrylamide) (PNIPAM) being more preferred.

PNIPAM is a thermosensitive material that exhibits large changes in surface energy in response to small changes in temperature. For example, see N. Mori, et al., Temperature Induced Changes in the Surface Wettability of SBR+PNIPA Films, 292, Macromol. Mater. Eng. 917, 917-22 (2007).

PNIPAM has in the side chains a hydrophobic isopropyl group at the base of which is a hydrophilic amide bond.

PNIPAM becomes soluble in water at temperatures lower than 32° C., where the hydrophilic amide bond moiety forms a hydrogen bond with a water molecule. On the other hand, at temperatures not lower than 32° C., the hydrogen bond is cleaved due to the vigorous thermal motion of the molecules, and the intramolecular or intermolecular hydrophobic interaction due to the hydrophobic isopropyl group moieties in the side chains becomes stronger to cause aggregation of the polymer chains, so that PNIPAM becomes insoluble in water.

As described above, PNIPAM has a LCST, which is a switching temperature at which it switches from a hydrophilic state to a hydrophobic state, of about 32° C.

The contact angle of a water droplet placed on a PNIPAM polymer film drastically changes above and below the LCST temperature. For example, the contact angle of a water droplet placed on a PINPAM film is about 600 (hydrophilic) at below 32° C. and then, when it is heated to a temperature higher than 32° C., exceeds about 930 (hydrophobic).

A temperature-responsive resin containing a PNIPAM group, which greatly changes its surface properties from hydrophilic to hydrophobic at about 32° C., can change tire performance in response to changes in temperature.

Although the group (polymer) that shows a LCST may suitably be a group as described above, it is also preferably a poly(alkyl vinyl ether), more preferably a group represented by the formula (A) below. In this case, the advantageous effect tends to be more suitably achieved. Such groups may be used alone or in combinations of two or more.

(A)

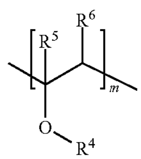

In the formula, m represents an integer of 1 to 1000, and $R^4$, $R^5$, and $R^6$ each independently represent a hydrogen atom or a hydrocarbyl group.

Preferably, m is 3 or larger, more preferably 5 or larger, still more preferably 10 or larger, particularly preferably 20 or larger, but is preferably 500 or smaller, more preferably 300 or smaller, still more preferably 150 or smaller, particularly preferably 80 or smaller, most preferably 40 or smaller, further most preferably 30 or smaller. When m is within the range indicated above, the advantageous effect tends to be better achieved.

The hydrocarbyl group for $R^4$ may have any number of carbon atoms. The number of carbon atoms is preferably 1 or larger, more preferably 2 or larger, but is preferably 20 or smaller, more preferably 18 or smaller, still more preferably 14 or smaller, particularly preferably 10 or smaller, most preferably 6 or smaller, further most preferably 4 or smaller. When the number of carbon atoms is within the range indicated above, the advantageous effect tends to be better achieved.

The hydrocarbyl group for $R^5$ and $R^6$ may have any number of carbon atoms. The number of carbon atoms is preferably 1 or larger, but is preferably 5 or smaller, more preferably 3 or smaller, still more preferably 2 or smaller, particularly preferably 1. When the number of carbon atoms is within the range indicated above, the advantageous effect tends to be better achieved.

Examples of the hydrocarbyl group for $R^4$, $R^5$, and $R^6$ include alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and aryl groups such as methylphenyl and ethylphenyl groups. Alkyl and cycloalkyl groups are preferred among these, with alkyl groups being more preferred.

Preferably, $R^4$ is an alkyl group, and $R^5$ and $R^6$ are hydrogen atoms. More preferably, $R^4$ is an ethyl group, and $R^5$ and $R^6$ are hydrogen atoms.

Examples of the groups of formula (A) include poly(methyl vinyl ether), poly(ethyl vinyl ether), poly(propyl vinyl ether), poly(butyl vinyl ether), poly(pentenyl ether), poly(hexyl vinyl ether), poly(heptyl vinyl ether), and poly(octyl ether). These may be used alone or in combinations of two or more. Poly(ethyl vinyl ether) (PEVE) is preferred among these. An extensive study of the present disclosers revealed that PEVE has a LCST of −20 to +5° C.

Although the group (polymer) that shows a LCST may suitably be a group as described above, it is also preferably a group represented by the formula (B) below. In this case, the advantageous effect tends to be more suitably achieved. Such groups may be used alone or in combinations of two or more.

(B)

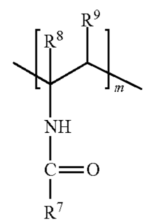

In the formula, m represents an integer of 1 to 1000, and $R^7$, $R^8$, and $R^9$ each independently represent a hydrogen atom or a hydrocarbyl group.

Preferably, m is 3 or larger, more preferably 5 or larger, still more preferably 10 or larger, particularly preferably 20 or larger, but is preferably 500 or smaller, more preferably 300 or smaller, still more preferably 150 or smaller, particularly preferably 80 or smaller, most preferably 40 or smaller, further most preferably 30 or smaller. When m is within the range indicated above, the advantageous effect tends to be better achieved.

The hydrocarbyl group for $R^7$ may have any number of carbon atoms. The number of carbon atoms is preferably 1 or larger, more preferably 2 or larger, but is preferably 20 or smaller, more preferably 18 or smaller, still more preferably 14 or smaller, particularly preferably 10 or smaller, most preferably 6 or smaller, further most preferably 4 or smaller. When the number of carbon atoms is within the range indicated above, the advantageous effect tends to be better achieved.

The hydrocarbyl group for $R^8$ and $R^9$ may have any number of carbon atoms. The number of carbon atoms is preferably 1 or larger, but is preferably 5 or smaller, more preferably 3 or smaller, still more preferably 2 or smaller, particularly preferably 1. When the number of carbon atoms is within the range indicated above, the advantageous effect tends to be better achieved.

Examples of the hydrocarbyl group for $R^7$, $R^8$, and $R^9$ include alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and aryl groups such as methylphenyl and ethylphenyl groups. Alkyl and cycloalkyl groups are preferred among these, with alkyl groups being more preferred.

Preferably, $R^7$ is an alkyl group, and $R^8$ and $R^9$ are hydrogen atoms. More preferably, $R^7$ is a n-propyl group or an isopropyl group, and $R^8$ and $R^9$ are hydrogen atoms.

Examples of the groups of formula (B) include poly(isopropylvinylacrylamide) (PNIPVM, $R^7$ is an isopropyl group and $R^8$ and $R^9$ are hydrogen atoms), poly(n-propylvinylacrylamide) (PNNPAM, $R^7$ is a n-propyl group and $R^8$ and $R^9$ are hydrogen atoms), poly(n-butylvinylacrylamide) ($R^7$ is a n-butyl group and $R^8$ and $R^9$ are hydrogen atoms), poly(tert-butylvinylacrylamide) ($R^7$ is a tert-butyl group and $R^8$ and $R^9$ are hydrogen atoms), poly(sec-butylvinylacrylamide) ($R^7$ is a sec-butyl group and $R^8$ and $R^9$ are hydrogen atoms), poly(methylvinylacrylamide) ($R^7$ is a methyl group and $R^8$ and $R^9$ are hydrogen atoms), poly(ethylvinylacrylamide) ($R^7$ is an ethyl group and $R^8$ and $R^9$ are hydrogen atoms), poly(n-pentylvinylacrylamide) ($R^7$ is a n-pentyl group and $R^8$ and $R^9$ are hydrogen atoms), and poly(isopentylvinylacrylamide) ($R^7$ is an isopentyl group and $R^8$ and $R^9$ are hydrogen atoms). These may be used alone or in combinations of two or more. PNIPVM, PNNPAM, poly(n-butylvinylacrylamide), and poly(tert-butylvinylacrylamide) are preferred among these, with PNIPVM or PNNPAM being more preferred. An extensive study of the present disclosers revealed that PNIPVM has a LCST of 39° C., and PNNPAM has a LCST of 32° C.

Examples of groups (polymers) that show a LCST other than the groups of formula (I), the groups of formula (A), and the groups of formula (B) include poly(N-vinylcaprolactam) represented by the formula (II) below (LSCT: about 31° C.), poly(2-alkyl-2-oxazolines) represented by the formula (III) below (LSCT: about 62° C. when R is an ethyl group, about 36° C. when R is an isopropyl group, and about 25° C. when R is a n-propyl group), alkyl-substituted celluloses (e.g., methyl cellulose represented by the formula (IV) below (LSCT: about 50° C.), hydroxypropyl cellulose, hydroxyethyl methyl cellulose, and hydroxypropyl methyl cellulose), poly(N-ethoxyethylacrylamide) (LSCT: about 35° C.), poly(N-ethoxyethylmethacrylamide) (LSCT: about 45° C.), poly(N-tetrahydrofurfurylacrylamide) (LSCT: about 28° C.), poly(N-tetrahydrofurfurylmethacrylamide) (LSCT: about 35° C.), polyvinyl methyl ether, poly[2-(dimethylamino)ethyl methacrylate], poly(3-ethyl-N-vinyl-2-pyrrolidone), hydroxybutyl chitosan, polyoxyethylene (20) sorbitan monostearate, polyoxyethylene (20) sorbitan monolaurate, polyoxyethylene (20) sorbitan monooleate, poly(ethylene glycol) methacrylates containing 2 to 6 ethylene glycol units, polyethylene glycol-co-polypropylene glycols (preferably those containing 2 to 8 ethylene glycol units and 2 to 8 polypropylene units, more preferably compounds represented by formula (A)), ethoxylated iso-$C_{13}H_{27}$-alcohols (preferably having an ethoxylation degree of 4 to 8), polyethylene glycols containing 4 to 50, preferably 4 to 20 ethylene glycol units, polypropylene glycols containing 4 to 30, preferably 4 to 15 propylene glycol units, monomethyl, dimethyl, monoethyl, or diethyl ethers of polyethylene glycols containing 4 to 50, preferably 4 to 20 ethylene glycol units, and monomethyl, dimethyl, monoethyl, or diethyl ethers of polypropylene glycols containing 4 to 50, preferably 4 to 20 propylene glycol units. These may be used alone or in combinations of two or more.

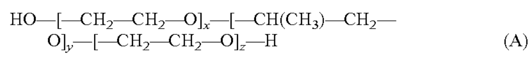

$$HO—[—CH_2—CH_2—O]_x—[—CH(CH_3)—CH_2—O]_y—[—CH_2—CH_2—O]_z—H \quad (A)$$

In the formula, y is 3 to 10, and each of x and z is 1 to 8, provided that y+x+z is 5 to 18.

(II)

(III)

(IV)

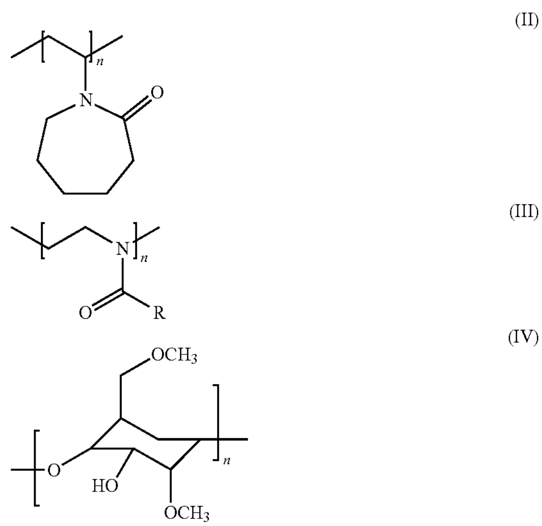

In formulas (II) to (IV), n is as defined for n in formula (I). In formula (III), R is an alkyl group selected from a n-propyl group, an isopropyl group, or an ethyl group.

Examples of groups (polymers) that show a LCST other than the above-mentioned groups include copolymers of N-isopropylacrylamide and butyl acrylate, block copolymers of N-isopropylacrylamide and polyethylene oxide, copolymers of N-isopropylacrylamide and fluoromonomers, polymer composites of poly-N-acetylacrylamide and polyethylene oxide, polymer composites of poly-N-acetylacrylamide and polyacrylamide, polymer composites of copolymers of N-acetylacrylamide and acrylamide and polyacrylamide, copolymers of N-acryloylglycinamide and N-acetylacrylamide, copolymers of 2-methoxyethyl acrylate and N,N-dimethylacrylamide, copolymers of a compound represented by the formula 1 below and N,N-dimethylacrylamide, poly(N,N-dimethyl(acrylamidopropyl)ammonium propanesulfate), copolymers of N,N-diethylacrylamide and maleic anhydride, copolymers of N,N-diethylacrylamide and dimethyl fumarate, copolymers of N,N-diethylacrylamide and hydroxyethyl methacrylate, copolymers of N,N-diethylacrylamide and butadiene, polymer composites of polyvinyl alcohol or polyvinyl alcohol hydrolysates with polyacrylamide, N-acryloylasparaginamide polymers, N-acryloylglutaminamide polymers, N-methacryloylasparaginamide polymers, copolymers of N-acryloylglycinamide and biotin methacrylamide derivatives, copolymers of N-acryloylglycinamide and N-acryloylasparaginamide, biotin-immobilized temperature-responsive magnetic fine particles (fine particles produced by reacting N-acryloylglycinamide, methacrylated magnetic fine particles, and biotin monomers), poly(sulfobetainemethacrylamide), copolymers of N-vinyl-n-butylamide and maleic anhydride, copolymers of N-vinyl-n-butylamide and dimethyl fumarate, copolymers of N-vinyl-n-butylamide and hydroxyethyl methacrylate, copolymers of N-vinyl-n-butylamide and butadiene, polyesteramides, polyetheramides, copolymers of ethylene oxide and propylene oxide, monoaminated products of copolymers of ethylene oxide and propylene oxide, polyethylene oxide-polypropylene oxide-polyethylene oxide block copolymers, polymer composites of polyethylene oxide and polyvinyl alcohol, maltopentaose-modified polypropylene oxides, poly(lactide-co-glycolide)-polyethylene oxide-polylactide triblock copolymers, copolymers of 2-methoxyethyl acrylate and acryloylmorpholine, copolymers of 2-methoxyethyl acrylate and N-vinylpyrrolidone, copolymers of 2-methoxyethyl acrylate and 2-hydroxyethyl acrylate, copolymers of 2-methoxyethyl acrylate and methoxytriethylene glycol acrylate, poly[2-(2-ethoxyethoxy)ethyl acrylate], poly (2-(2-ethoxyethoxy)ethyl acrylate-co-2-(methoxyethoxy)ethyl methacrylate), poly(2-(N,N-dimethylaminoethyl)methacrylate) copolymers of N-vinylcaprolactam and hydroxyethyl methacrylate, copolymers of methyl vinyl ether and hydroxyethyl methacrylate, N-vinylcaprolactam polymers, copolymers of N-vinylcaprolactam and maleic anhydride, copolymers of N-vinylcaprolactam and dimethyl fumarate, copolymers of N-vinylcaprolactam and butadiene, copolymers of N-vinylcaprolactam, vinylpyrrolidine, and glycidyl methacrylate, copolymers of N-vinylcaprolactam, vinylpyrrolidine, and methacrylic acid, copolymers of N-vinylcaprolactam, vinylpyrrolidone, and α,α-dimethyl-meta-isopropenylbenzyl isocyanate, copolymers of N-vinylcaprolactam, vinylpyrrolidone, and hydroxyethyl methacrylate, poly(1-ethyl-3-vinyl-2-imidazolidone), poly(1-methyl-3-vinyl-2-imidazolidone), poly(1-n-propyl-3-vinyl-2-imidazolidone), poly(1-isopropyl-3-vinyl-2-imidazolidone), poly(1-acetyl-3-vinyl-2-imidazolidone), poly(1-propionyl-3-vinyl-2-imidazolidone), copolymers represented by the formula 2 below, poly(N-vinyl-2-imidazolidone compounds), copolymers of 2-hydroxyethyl vinyl ether and vinyl acetate, copolymers of diethylene glycol monovinyl ether and vinyl acetate, copolymers of methyl vinyl ether and maleic anhydride, copolymers of methyl vinyl ether and dimethyl fumarate, carbamoylated polyamino acids, polymers of a compound represented by the formula 3 below, polymers of a compound represented by the formula 4 below, poly (orthoesters) having a pendant[N-(2-hydroxyethyl)-L-glutamine] group, polyacetal-poly[N-(2-hydroxyethyl)-L-glutamine]-polyacetal triblock copolymers, poly[N-(2-hydroxyethyl)-L-glutamine]-poly(orthoester)-poly[N-(2-hydroxyethyl)-L-glutamine] triblock copolymers, poly[N-(2-hydroxyethyl)-L-glutamine]-polyacetal diblock copolymers, amino-terminated poly[N-(2-hydroxyethyl)-L-glutamines], amino-terminated poly(orthoesters), amino-terminated polyacetals, cellulose triacetate, magnetic nanoparticles, amino group-containing polystyrenes, and glycoluril polymers. These may be used alone or in combinations of two or more.

formula 1

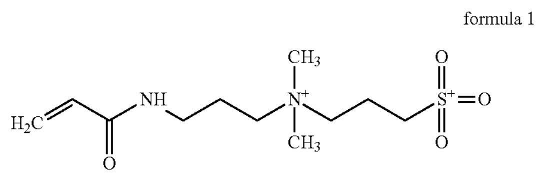

formula 2

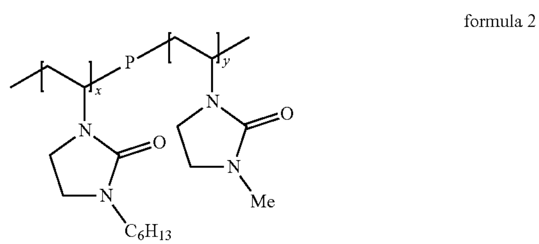

-continued formula 3

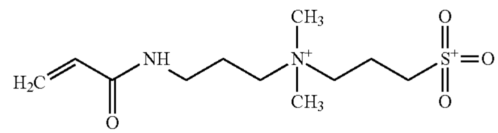

formula 4

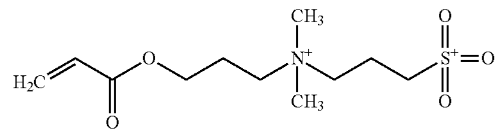

The weight average molecular weight of the group that changes its hydrophilicity with changes in temperature (the group formed of a temperature-responsive polymer) is preferably 330 or more, more preferably 560 or more, still more preferably 1130 or more, but is preferably 57000 or less, more preferably 34000 or less, still more preferably 17000 or less. When the weight average molecular weight is within the range indicated above, the advantageous effect tends to be better achieved.

The phase transition temperature (lower critical solution temperature (LOST) or upper critical solution temperature (UCST)) of the temperature-responsive polymer is preferably −50° C. or higher, more preferably −40° C. or higher, still more preferably −30° C. or higher, particularly preferably −20° C. or higher, most preferably −10° C. or higher, even most preferably 0° C. or higher, further most preferably 5° C. or higher, but is preferably 60° C. or lower, more preferably 50° C. or lower, still more preferably 40° C. or lower, particularly preferably 35° C. or lower, most preferably 30° C. or lower, even most preferably 25° C. or lower, further most preferably 20° C. or lower. When the phase transition temperature is within the range indicated above, the advantageous effect tends to be better achieved.

Herein, the phase transition temperature of the temperature-responsive polymer is measured using a temperature-controllable spectrophotometer. A temperature-responsive polymer aqueous solution adjusted at 10% by mass may be put into a cell, which may then be covered with a parafilm for preventing vaporization and an in-cell temperature sensor may be attached thereto. Experiments may be conducted at a measurement wavelength of 600 nm, an acquisition temperature of 0.1° C., and a rate of temperature rise of 0.1° C. The temperature at which the transmittance reaches 90% is defined as the phase transition temperature.

Here, the temperature-responsive polymer refers to a temperature-responsive polymer group (temperature-responsive polymer) cleaved from a temperature-responsive resin containing the temperature-responsive polymer group.

Next, "B" is described.

"B" is not limited as long as it includes at least one selected from the group consisting of terpene resins, rosin resins, styrene resins, C5 resins, C9 resins, C5/C9 resins, coumarone resins, indene resins, and olefin resins.

Preferably, "B" is at least one selected from the group consisting of terpene resins, rosin resins, styrene resins, C5 resins, C9 resins, C5/C9 resins, coumarone resins, indene resins, and olefin resins. These may be used alone or in admixtures of two or more. Moreover, the resins themselves may be copolymers of monomer components of different origins. "B" is more preferably a terpene resin, a styrene resin, a C9 resin, a C5/C9 resin, a coumarone resin, and/or an indene resin, still more preferably a styrene resin, because these resins have a good compatibility with the styrene-based elastomer, so that the advantageous effect can be more suitably achieved.

Examples of such commercial resins include those available from Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JXTG Nippon Oil & Energy Corporation, Arakawa Chemical Industries, Ltd., Taoka Chemical Co., Ltd., etc.

The terpene resins may be any resin that contains a unit derived from a terpene compound, and examples include polyterpenes (resins produced by polymerizing terpene compounds), terpene aromatic resins (resins produced by copolymerizing terpene compounds and aromatic compounds), and aromatic modified terpene resins (resins produced by modifying terpene resins with aromatic compounds). These may be used alone or in combinations of two or more.

The term "terpene compound" refers to a hydrocarbon having a composition represented by $(C_5H_8)_n$ or an oxygen-containing derivative thereof, each of which has a terpene backbone and is classified as, for example, a monoterpene ($C_{10}H_{16}$), sesquiterpene ($C_{15}H_{24}$), or diterpene ($C_{20}H_{32}$) Examples of such terpene compounds include α-pinene, β-pinene, dipentene, limonene, myrcene, allocimene, ocimene, α-phellandrene, α-terpinene, γ-terpinene, terpinolene, 1,8-cineole, 1,4-cineole, α-terpineol, β-terpineol, and γ-terpineol. These may be used alone or in combinations of two or more.

The aromatic compounds may be any compound having an aromatic ring. Examples include phenol compounds such as phenol, alkylphenols, alkoxyphenols, and unsaturated hydrocarbon group-containing phenols; naphthol compounds such as naphthol, alkylnaphthols, alkoxynaphthols, and unsaturated hydrocarbon group-containing naphthols; and styrene and styrene derivatives such as alkylstyrenes, alkoxystyrenes, and unsaturated hydrocarbon group-containing styrenes. These may be used alone or in combinations of two or more. Styrene is preferred among these.

Examples of the terpene compounds also include resin acids (rosin acids) such as abietic acid, neoabietic acid, palustric acid, levopimaric acid, pimaric acid, and isopimaric acid. Herein, the terpene resins formed mainly (at least 50% by mass, preferably at least 80% by mass) of rosin acids produced by processing pine resin are regarded as rosin resins.

Here, examples of the rosin resins include natural rosin resins (polymerized rosins) such as gum rosins, wood rosins, and tall oil rosins; modified rosin resins such as maleic acid-modified rosin resins and rosin-modified phenol resins; rosin esters such as rosin glycerol esters; and disproportionated rosin resins obtained by disproportionation of rosin resins. These may be used alone or in combinations of two or more.

The styrene resins refer to polymers formed from styrene monomers as structural monomers, and examples include polymers polymerized from styrene monomers as main components (at least 50% by mass, preferably at least 80% by mass). Specific examples include homopolymers polymerized from single styrene monomers (e.g., styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene), copolymers copolymerized from two or more styrene monomers, and copolymers of styrene monomers and additional monomers copolymerizable therewith. These may be used alone or in combinations of two or more. Copolymers of styrene monomers and additional monomers copolymerizable therewith are preferred among these, with styrene monomers being more preferred.

Examples of the additional monomers include acrylonitriles such as acrylonitrile and methacrylonitrile; unsaturated carboxylic acids such as acrylic and methacrylic acid; unsaturated carboxylic acid esters such as methyl acrylate and methyl methacrylate; dienes such as chloroprene, butadiene, and isoprene; olefins such as 1-butene and 1-pentene; and α,β-unsaturated carboxylic acids and acid anhydrides thereof such as maleic anhydride. These may be used alone or in combinations of two or more. Unsaturated carboxylic acids are preferred among these, with acrylic or methacrylic acid being more preferred.

Preferred among the styrene resins are styrene homopolymers and α-methylstyrene resins (e.g., α-methylstyrene homopolymers, copolymers of α-methylstyrene and styrene), with styrene homopolymers or α-methylstyrene homopolymers being more preferred, with styrene homopolymers being more preferred.

Examples of the C5 resins include aliphatic petroleum resins containing, as main components (at least 50% by mass, preferably at least 80% by mass), olefins or diolefins from C5 fractions obtained by naphtha cracking. Examples of the C9 resins include aromatic petroleum resins containing, as main components (at least 50% by mass, preferably at least 80% by mass), vinyltoluene from C9 fractions obtained by naphtha cracking. Examples of the C5/C9 resins include resins containing, as main components (at least 50% by mass, preferably at least 80% by mass), olefins or diolefins from C5 fractions and vinyltoluene from C9 fractions. These resins may be resins copolymerized with the above-mentioned additional monomers. These may be used alone or in combinations of two or more.

Examples of the coumarone resins include resins containing coumarone as a main component (at least 50% by mass, preferably at least 80% by mass). Examples of the indene resins include resins containing indene or methylindene as main components (at least 50% by mass, preferably at least 80% by mass). These resins may be resins copolymerized with the above-mentioned additional monomers. These may be used alone or in combinations of two or more. Here, the coumarone resins and the indene resins include coumarone-indene resins.

Examples of the olefin resins include polyethylene resins such as polyethylene, ethylene-propylene copolymers, ethylene-propylene-non-conjugated diene copolymers, ethylene-butene copolymers, ethylene-hexene copolymers, ethylene-octene copolymers, ethylene-vinyl acetate copolymers, ethylene-vinyl alcohol copolymers, ethylene-ethyl acrylate copolymers, and chlorinated polyethylene; polypropylene resins such as polypropylene, propylene-ethylene random copolymers, propylene-ethylene block copolymers, and chlorinated polypropylene; polybutene, polyisobutylene, polymethylpentene, and copolymers of cyclic olefins. These may be used alone or in combinations of two or more.

"A" and "B" may be bound to each other by any method. A person skilled in the art can bind them. For example, monomers capable of forming "A" may first be polymerized to form an "A" block, and then monomers capable of forming "B" may be added to the reaction system to form a "B" block following the "A" block, whereby a compound including "A" and "B" bound to each other can be produced.

Specifically, a temperature-responsive resin can be produced as described in JP 2019-83761 A, for example.

The ratio (% by mass) of "A" to "B" ("A":"B") in the temperature-responsive resin is preferably 50:50 to 98:2. The lower limit is preferably 60:40, more preferably 65:35. The upper limit is preferably 95:5, more preferably 90:10. When the ratio is within the range indicated above, the advantageous effect tends to be better achieved.

The ratio of "A" to "B" may be measured by NMR.

The temperature-responsive resin is preferably a block copolymer, more preferably a block copolymer having a block formed of "A" and a block formed of "B", still more preferably a block copolymer having a block formed of "A" at one terminal and a block formed of "B" at the other terminal, particularly preferably a diblock copolymer formed of a block formed of "A" and a block formed of "B".

The temperature-responsive resin is preferably a compound including "A" and "B" bound to each other.

"A" is preferably a group that changes its hydrophilicity with changes in temperature, more preferably a temperature-responsive polymer, still more preferably a polymer that shows a lower critical solution temperature in water, particularly preferably a poly(N-substituted (meth)acrylamide) or a group of formula (B), most preferably a group of formula (I) or a group of formula (B).

Here, "B" is preferably a terpene resin, a styrene resin, a C9 resin, a C5/C9 resin, a coumarone resin, and/or an indene resin, more preferably a styrene resin.

The weight average molecular weight (Mw) of the temperature-responsive resin is preferably 500 or more, more preferably 1,000 or more, still more preferably 5,000 or more, particularly preferably 10,000 or more, most preferably 20,000 or more, further most preferably 30,000 or more, but is preferably 80,000 or less, more preferably 75,000 or less. When the Mw is within the range indicated above, the advantageous effect tends to be better achieved.

The amount of temperature-responsive resins per 100 parts by mass of the elastomer component content (preferably per 100 parts by mass of the rubber component content) is preferably 1 part by mass or more, more preferably 5 parts by mass or more, still more preferably 10 parts by mass or more, particularly preferably 15 parts by mass or more, but is preferably 60 parts by mass or less, more preferably 50 parts by mass or less, still more preferably 40 parts by mass or less, particularly preferably 30 parts by mass or less. When the amount is within the range indicated above, the advantageous effect tends to be better achieved.

Water is preferably present in order to allow the temperature-responsive resin to more suitably change its hydrophilicity with changes in temperature. Thus, the elastomer composition preferably contains at least one water-absorbent material such as a water-absorbent fiber, a water-absorbent elastomer, and/or a water-absorbent resin. In this case, the elastomer composition can suitably incorporate water, so that the temperature-responsive resin can more suitably change its hydrophilicity with changes in temperature. These materials may be used alone or in combinations of two or more.

Examples of such water-absorbent materials include heteroatom-containing materials (fibers, elastomers, resins).

The term "heteroatom" refers to an atom other than a carbon atom and a hydrogen atom, and may be any heteroatom capable of forming a reversible molecular bond, such as a hydrogen bond or an ionic bond, with water. The heteroatom is preferably at least one atom selected from the group consisting of an oxygen atom, a nitrogen atom, a silicon atom, a sulfur atom, a phosphorus atom, and halogen atoms, more preferably an oxygen atom, a nitrogen atom, or a silicon atom, still more preferably an oxygen atom.

Examples of structures or groups containing an oxygen atom include ether groups, esters, carboxy groups, carbonyl groups, alkoxy groups, and hydroxy groups. Ether groups are preferred among these, with oxyalkylene groups being more preferred.

Examples of structures or groups containing a nitrogen atom include amino groups (primary, secondary, or tertiary amino groups), amide groups, nitrile groups, and nitro groups. Amino groups are preferred among these, with tertiary amino groups being more preferred.

Examples of structures or groups containing a silicon atom include silyl groups, alkoxysilyl groups, and silanol groups. Silyl groups being preferred among these, with alkoxysilyl groups being more preferred.

Examples of structures or groups containing a sulfur atom include sulfide groups, sulfuric acid groups, sulfates, and sulfo groups.

Examples of structures or groups containing a phosphorus atom include phosphoric acid groups and phosphates.

Examples of structures or groups containing halogen atoms include halogeno groups such as fluoro, chloro, bromo, and iodo groups.

Examples of water-absorbent fibers include cellulose fibers which contain hydroxy groups.

Cellulose microfibrils are preferred among the cellulose fibers. Any cellulose microfibril derived from a naturally-occurring material may be used. Examples include those derived from: resource biomass such as fruits, grains, and root vegetables; wood, bamboo, hemp, jute, and kenaf, and pulp, paper, or cloth produced therefrom; waste biomass such as agricultural waste, food waste, and sewage sludge; unused biomass such as rice straw, wheat straw, and thinnings; and celluloses produced by ascidians, acetic acid bacteria, or other organisms. These may be used alone or in combinations of two or more.

Examples of water-absorbent elastomers include oxyalkylene group-containing elastomers, examples of which include epoxide/allyl glycidyl ether copolymers, amine/allyl glycidyl ether copolymers, and silyl/allyl glycidyl ether copolymers. These may be used alone or in combinations of two or more.

Examples of water-absorbent resins include polyvinyl alcohol, polyethylene glycol, sodium polyacrylate, polyurethane, polyvinyl acetate, epoxy resins, and cellulose resins. These may be used alone or in combinations of two or more.

The amount of water-absorbent fibers, water-absorbent elastomers, and/or water-absorbent resins per 100 parts by mass of the elastomer component content (preferably per 100 parts by mass of the rubber component content) is preferably 1 part by mass or more, more preferably 5 parts by mass or more, but is preferably 40 parts by mass or less, more preferably 30 parts by mass or less, still more preferably 20 parts by mass or less. When the amount is within the range indicated above, the advantageous effect tends to be better achieved.

Here, when two or more water-absorbent fibers, water-absorbent elastomers, and/or water-absorbent resins are combined, the above-mentioned amount refers to the total amount thereof.

The composition preferably contains silica as a filler (reinforcing filler). Since silica is a hydrophilic material containing a hydroxy group, the elastomer composition can suitably incorporate water, so that the temperature-responsive resin can more suitably change its hydrophilicity with changes in temperature.

Any silica may be used, and examples include dry silica (anhydrous silicic acid) and wet silica (hydrous silicic acid). These may be used alone or in combinations of two or more. Wet silica is preferred among these because it has a large number of silanol groups.

Examples of commercial silica include those available from Degussa, Rhodia, Tosoh Silica Corporation, Solvay Japan, Tokuyama Corporation, etc.

The nitrogen adsorption specific surface area ($N_2SA$) of the silica is preferably 70 $m^2/g$ or more, more preferably 140 $m^2/g$ or more. The $N_2SA$ is also preferably 300 $m^2/g$ or less, more preferably 250 $m^2/g$ or less. When the $N_2SA$ is within the range indicated above, the advantageous effect tends to be better achieved.

Here, the $N_2SA$ of the silica can be measured in accordance with ASTM D3037-81.

The amount of silica per 100 parts by mass of the elastomer component content (preferably per 100 parts by mass of the rubber component content) is preferably 5 parts by mass or more, more preferably 10 parts by mass or more, still more preferably 15 parts by mass or more, particularly preferably 20 parts by mass or more, most preferably 30 parts by mass or more, further most preferably 50 parts by mass or more, but is preferably 200 parts by mass or less, more preferably 180 parts by mass or less, still more preferably 150 parts by mass or less, particularly preferably 120 parts by mass or less, most preferably 100 parts by mass or less. When the amount is within the range indicated above, the advantageous effect tends to be better achieved.

When the composition contains silica, it preferably contains a silane coupling agent together with the silica.

Any silane coupling agent may be used. Examples include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis (2-trimethoxysilylethyl)tetrasulfide, bis (2-triethoxysilylethyl)trisulfide, bis (4-trimethoxysilylbutyl) trisulfide, bis(3-triethoxysilylpropyl)disulfide, bis (2-triethoxysilylethyl)disulfide, bis(4-triethoxysilylbutyl) disulfide, bis(3-trimethoxysilylpropyl)disulfide, bis(2-trimethoxysilylethyl)disulfide, bis (4-trimethoxysilylbutyl) disulfide, 3-trimethoxysilylpropyl-N,N-dimethylthiocarbamoyltetrasulfide, 2-triethoxysilylethyl-N,N-dimethylthiocarbamoyltetrasulfide, and 3-triethoxysilylpropyl methacrylate monosulfide; mercapto silane coupling agents such as 3-mercaptopropyltrimethoxysilane, 2-mercaptoethyltriethoxysilane, and NXT and NXT-Z both available from Momentive; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. These may be used alone or in combinations of two or more. Sulfide silane coupling agents are preferred among these.

Examples of commercial silane coupling agents include those available from Degussa, Momentive, Shin-Etsu Silicone, Tokyo Chemical Industry Co., Ltd., AZmax. Co., Dow Corning Toray Co., Ltd., etc.

The amount of silane coupling agents, if present, per 100 parts by mass of the silica content is preferably 0.1 parts by mass or more, more preferably 3 parts by mass or more, still more preferably 6 parts by mass or more. The amount is also preferably 20 parts by mass or less, more preferably 16 parts by mass or less, still more preferably 12 parts by mass or less, particularly preferably 10 parts by mass or less. When the amount is within the range indicated above, the advantageous effect tends to be better achieved.

The composition preferably contains carbon black.

Examples of the carbon black include N134, N110, N220, N234, N219, N339, N330, N326, N351, N550, and N762. These may be used alone or in combinations of two or more.

The nitrogen adsorption specific surface area ($N_2SA$) of the carbon black is preferably 5 $m^2/g$ or more, more preferably 30 $m^2/g$ or more, still more preferably 60 $m^2/g$ or more, particularly preferably 80 $m^2/g$ or more, most preferably 100 $m^2/g$ or more. The $N_2SA$ is also preferably 300 $m^2/g$ or less, more preferably 200 $m^2/g$ or less, still more preferably 150 $m^2/g$ or less. When the $N_2SA$ is within the range indicated above, the advantageous effect tends to be better achieved.

Here, the nitrogen adsorption specific surface area of the carbon black can be determined in accordance with JIS K 6217-2:2001.

The dibutyl phthalate oil absorption (DBP) of the carbon black is preferably 5 ml/100 g or more, more preferably 70 ml/100 g or more, still more preferably 90 ml/100 g or more. The DBP is also preferably 300 ml/100 g or less, more preferably 200 ml/100 g or less, still more preferably 160 ml/100 g or less, particularly preferably 120 ml/100 g or less. When the DBP is within the range indicated above, the advantageous effect tends to be better achieved.

Here, the DBP of the carbon black can be measured in accordance with JIS K 6217-4:2001.

Examples of commercial carbon black include those available from Asahi Carbon Co., Ltd., Cabot Japan K.K., Tokai Carbon Co., Ltd., Mitsubishi Chemical Corporation, Lion Corporation, NSCC Carbon Co., Ltd., Columbia Carbon, etc.

The amount of carbon black per 100 parts by mass of the elastomer component content (preferably per 100 parts by mass of the rubber component content) is preferably 0.1 parts by mass or more, more preferably 1 part by mass or more, still more preferably 3 parts by mass or more, particularly preferably 5 parts by mass or more, but is preferably 100 parts by mass or less, more preferably 50 parts by mass or less, still more preferably 30 parts by mass or less, particularly preferably 20 parts by mass or less, most preferably 10 parts by mass or less. When the amount is within the range indicated above, the advantageous effect tends to be better achieved.

The composition preferably contains sulfur.

Examples of the sulfur include those commonly used in the rubber industry, such as powdered sulfur, precipitated sulfur, colloidal sulfur, insoluble sulfur, highly dispersible sulfur, and soluble sulfur. These may be used alone or in combinations of two or more.

Examples of commercial sulfur include those available from Tsurumi Chemical Industry Co., Ltd., Karuizawa Sulfur Co., Ltd., Shikoku Chemicals Corporation, Flexsys, Nippon Kanryu Industry Co., Ltd., Hosoi Chemical Industry Co., Ltd., etc.

The amount of sulfur per 100 parts by mass of the elastomer component content (preferably per 100 parts by mass of the rubber component content) is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

The composition preferably contains a vulcanization accelerator.

Examples of the vulcanization accelerator include thiazole vulcanization accelerators such as 2-mercaptobenzothiazole and di-2-benzothiazolyl disulfide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazolylsulfenamide, N-t-butyl-2-benzothiazolylsulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone or in combinations of two or more.

Examples of commercial vulcanization accelerators include those available from Kawaguchi Chemical Industry Co., Ltd., Ouchi Shinko Chemical Industrial Co., Ltd., Rhein Chemie, etc.

The amount of vulcanization accelerators per 100 parts by mass of the elastomer component content (preferably per 100 parts by mass of the rubber component content) is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

The composition preferably contains stearic acid.

Conventionally known stearic acid may be used, including, for example, those available from NOF Corporation, Kao Corporation, Fujifilm Wako Pure Chemical Corporation, Chiba Fatty Acid Co., Ltd., etc.

The amount of stearic acid per 100 parts by mass of the elastomer component content (preferably per 100 parts by mass of the rubber component content) is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

The composition may contain zinc oxide.

Conventionally known zinc oxide may be used, including, for example, those available from Mitsui Mining & Smelting Co., Ltd., Toho Zinc Co., Ltd., HakusuiTech Co., Ltd., Seido Chemical Industry Co., Ltd., Sakai Chemical Industry Co., Ltd., etc.

The amount of zinc oxide per 100 parts by mass of the elastomer component content (preferably per 100 parts by mass of the rubber component content) is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

The composition may contain an antioxidant.

Examples of the antioxidant include naphthylamine antioxidants such as phenyl-α-naphthylamine; diphenylamine antioxidants such as octylated diphenylamine and 4,4'-bis(α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as polymerized 2,2,4-trimethyl-1,2-dihydroquinoline; monophenolic antioxidants such as 2,6-di-t-butyl-4-methylphenol and styrenated phenol; and bis-, tris-, or polyphenolic antioxidants such as tetrakis[methylene-3-(3',5'-di-t-butyl-4'-hydroxyphenyl)propionate]methane. These may be used alone or in combinations of two or more. Preferred among these are p-phenylenediamine and quinoline antioxidants, with p-phenylenediamine antioxidants being more preferred.

Examples of commercial antioxidants include those available from Seiko Chemical Co., Ltd., Sumitomo Chemical Co., Ltd., Ouchi Shinko Chemical Industrial Co., Ltd., Flexsys, etc.

The amount of antioxidants per 100 parts by mass of the elastomer component content (preferably per 100 parts by mass of the rubber component content) is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

The composition may contain a wax.

Any wax may be used, and examples include petroleum waxes such as paraffin waxes and microcrystalline waxes; naturally-occurring waxes such as plant waxes and animal waxes; and synthetic waxes such as polymers of ethylene, propylene, or other similar monomers. These may be used alone or in combinations of two or more.

Examples of commercial waxes include those available from Ouchi Shinko Chemical Industrial Co., Ltd., Nippon Seiro Co., Ltd., Seiko Chemical Co., Ltd., etc.

The amount of waxes per 100 parts by mass of the elastomer component content (preferably per 100 parts by mass of the rubber component content) is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

The rubber composition preferably contains a liquid plasticizer.

Herein, the term "plasticizer" refers to an organic compound that imparts plasticity to rubber. The term "liquid plasticizer" refers to a plasticizer which is liquid at 0° C. or higher, or specifically, an organic compound which follows the shape of a container different from the shape of the organic compound when it is allowed to stand still for one minute in the container. Such liquid plasticizers may be used alone or in combinations of two or more.

Specific examples of the liquid plasticizers include oils, ester plasticizers, and liquid resins (also collectively referred to as oils and the like). These may be used alone or in combinations of two or more. Oils are preferred among these.

The amount of liquid plasticizers per 100 parts by mass of the elastomer component content (preferably per 100 parts by mass of the rubber component content) is preferably 1 part by mass or more, more preferably 5 parts by mass or more, still more preferably 10 parts by mass or more. The amount is also preferably 100 parts by mass or less, more preferably 50 parts by mass or less, still more preferably 30 parts by mass or less. When the amount is within the range indicated above, the advantageous effect tends to be better achieved.

Any oil may be used, and examples include conventional oils, including: process oils such as paraffinic process oils, aromatic process oils, and naphthenic process oils; low polycyclic aromatic (PCA) process oils such as TDAE and MES; vegetable oils; and mixtures of the foregoing. These may be used alone or in combinations of two or more. Aromatic process oils are preferred among these. Specific examples of the aromatic process oils include Diana Process Oil AH series available from Idemitsu Kosan Co., Ltd.

Examples of commercial oils include those available from Idemitsu Kosan Co., Ltd., Sankyo Yuka Kogyo K.K., Japan Energy Corporation, Olisoy, H&R, Hokoku Corporation, Showa Shell Sekiyu K.K., Fuji Kosan Co., Ltd., etc.

Examples of ester plasticizers include the vegetable oils mentioned above; synthetic plasticizers and processed vegetable oils, such as glycerol fatty acid monoesters, glycerol fatty acid diesters, and glycerol fatty acid triesters; and phosphoric acid esters (e.g., phosphate plasticizers and mixtures thereof). These may be used alone or in combinations of two or more.

Suitable examples of the ester plasticizers include fatty acid esters represented by the following formula:

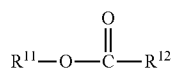

wherein $R^{11}$ represents a C1-C8 linear or branched alkyl group, a C1-C8 linear or branched alkenyl group, or a C2-C6 linear or branched alkyl group substituted with 1 to 5 hydroxy groups; and $R^{12}$ represents a C11-C21 alkyl or alkenyl group.

Examples of $R^{11}$ include methyl, ethyl, 2-ethylhexyl, isopropyl, and octyl groups, and groups obtained by substituting these groups with 1 to 5 hydroxy groups. Examples of $R^{12}$ include linear or branched alkyl or alkenyl groups such as lauryl, myristyl, palmityl, stearyl, and oleyl groups.

Examples of the fatty acid esters include alkyl oleates, alkyl stearates, alkyl linoleates, and alkyl palmitates. Alkyl oleates (e.g., methyl oleate, ethyl oleate, 2-ethylhexyl oleate, isopropyl oleate, octyl oleate) are preferred among these. In this case, the amount of alkyl oleates based on 100% by mass of the amount of fatty acid esters is preferably 80% by mass or more.

Other examples of the fatty acid esters include fatty acid monoesters or diesters formed from fatty acids (e.g., oleic acid, stearic acid, linoleic acid, palmitic acid) and alcohols (e.g., ethylene glycol, glycerol, trimethylolpropane, pentaerythritol, erythritol, xylitol, sorbitol, dulcitol, mannitol, inositol). Oleic acid monoesters are preferred among these. In this case, the amount of oleic acid monoesters based on 100% by mass of the combined amount of fatty acid monoesters and fatty acid diesters is preferably 80% by mass or more.

Phosphoric acid esters can be suitably used as ester plasticizers.

Preferred phosphoric acid esters include C12-C30 compounds, among which C12-C30 trialkyl phosphates are suitable. Here, the number of carbon atoms of the trialkyl phosphates means the total number of carbon atoms in the three alkyl groups. The three alkyl groups may be the same or different groups. Examples of the alkyl groups include linear or branched alkyl groups which may contain a heteroatom such as an oxygen atom or may be substituted with a halogen atom such as fluorine, chlorine, bromine, or iodine.

Other examples of the phosphoric acid esters include known phosphoric acid ester plasticizers such as: mono-, di-, or triesters of phosphoric acid with C1-C12 monoalcohols or their (poly)oxyalkylene adducts; and compounds obtained by substituting one or two alkyl groups of the aforementioned trialkyl phosphates with phenyl group(s). Specific examples include tris(2-ethylhexyl)phosphate, trimethyl phosphate, triethyl phosphate, tributyl phosphate, trioctyl phosphate, triphenyl phosphate, tricresyl phosphate, trixylenyl phosphate, cresyl diphenyl phosphate, 2-ethylhexyl diphenyl phosphate, and tris(2-butoxyethyl)phosphate.

Examples of liquid resins include terpene resins, rosin resins, styrene resins, C5 resins, C9 resins, C5/C9 resins, coumarone resins, indene resins, olefin resins, urethane resins, acrylic resins, p-t-butylphenol acetylene resins, dicyclopentadiene resins (DCPD resins), and other resins which are liquid at 0° C. These may be used alone or in admixtures of two or more. Moreover, the resins themselves may be copolymers of monomer components of different origins.

Further, examples of other liquid resins include liquid (meaning liquid at 0° C., hereinafter the same) farnesene polymers such as liquid farnesene homopolymers, liquid farnesene-styrene copolymers, liquid farnesene-butadiene copolymers, liquid farnesene-styrene-butadiene copolymers, liquid farnesene-isoprene copolymers, and liquid farnesene-styrene-isoprene copolymers; liquid myrcene polymers such as liquid myrcene homopolymers, liquid myrcene-styrene copolymers, liquid myrcene-butadiene copolymers, liquid myrcene-styrene-butadiene copolymers, liquid myrcene-isoprene copolymers, and liquid myrcene-styrene-isoprene copolymers; liquid diene polymers such as liquid styrene butadiene copolymers (liquid SBR), liquid polybutadiene polymers (liquid BR), liquid polyisoprene polymers (liquid IR), liquid styrene-isoprene copolymers (liquid SIR), liquid styrene-butadiene-styrene block copolymers (liquid SBS block polymers), and liquid styrene-isoprene-styrene block copolymers (liquid SIS block polymers); liquid olefin polymers containing an olefin resin (e.g., polyethylene, polypropylene) as a hard segment (hard phase) and a rubber component as a soft segment (soft phase); and liquid ester polymers containing a polyester as a hard segment and a polyether, polyester, or the like as a soft segment. These may be modified at the chain end or backbone by a polar group. These may be used alone or in combinations of two or more.

Examples of commercial liquid resins include those available from Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JXTG Nippon Oil & Energy Corporation, Arakawa Chemical Industries, Ltd., Taoka Chemical Co., Ltd., Sartomer, Kuraray Co., Ltd., etc.

In addition to the above-mentioned components, the composition may contain additives commonly used in the tire industry, such as vulcanizing agents other than sulfur (e.g., organic crosslinking agents, organic peroxides), calcium carbonate, mica such as sericite, aluminum hydroxide, magnesium oxide, magnesium hydroxide, clay, talc, alumina, and titanium oxide. The amounts of these components are each preferably 0.1 parts by mass or more, but preferably 200 parts by mass or less, per 100 parts by mass of the elastomer component content (preferably the rubber component content).

The composition may be prepared, for example, by kneading the components using a rubber kneading machine such as an open roll mill or a Banbury mixer, and then vulcanizing the kneaded mixture.

The kneading conditions are as follows. In a base kneading step of kneading additives other than crosslinking agents (vulcanizing agents) and vulcanization accelerators, the kneading temperature is usually 100 to 180° C., preferably 120 to 170° C. In a final kneading step of kneading vulcanizing agents and vulcanization accelerators, the kneading temperature is usually 120° C. or lower, preferably 80 to 110° C. Then, the composition obtained after kneading vulcanizing agents and vulcanization accelerators is usually vulcanized by, for example, press vulcanization. The vulcanization temperature is usually 140 to 190° C., preferably 150 to 185° C.

The composition may be used (as a tire rubber composition) in tire components, such as treads (cap treads), sidewalls, base treads, undertreads, clinches, bead apexes, breaker cushion rubbers, rubbers for carcass cord topping, insulations, chafers, and innerliners, and side reinforcement layers of run-flat tires. The composition may be suitably used in outer layer components of tires, such as treads (cap treads), sidewalls, clinches, and innerliners, among others, and may be more suitably used in treads (cap treads).

The tire of the present disclosure may be produced from the composition by usual methods. Specifically, the tire may be produced by extruding the unvulcanized composition, which contains additives as needed, into the shape of a tire component (particularly an outer layer component of a tire, such as a tread (cap tread)), followed by forming and assembling it with other tire components in a usual manner on a tire building machine to build an unvulcanized tire, and then heating and pressurizing the unvulcanized tire in a vulcanizer.

The tire may be any type of tire, including pneumatic tires, solid tires, and airless tires. Preferred among these are pneumatic tires.

The tire may be suitably used as a tire for passenger vehicles, large passenger vehicles, large SUVs, trucks and buses, or two-wheeled vehicles, or as a racing tire, a winter tire (studless winter tire, snow tire, studded tire) an all-season tire, a run-flat tire, an aircraft tire, a mining tire, etc. The tire may be more suitably used as a winter tire (studless winter tire, snow tire, studded tire) or an all-season tire, among others.

Preferably, the tire includes a temperature-responsive component including the elastomer composition, and the temperature-responsive component has a maximum thickness of 1 mm or more.

The maximum thickness of the temperature responsive component is preferably 1 mm or more, more preferably 3 mm or more, still more preferably 5 mm or more. The upper limit is not limited, but is preferably 20 mm or less, more preferably 15 mm or less, still more preferably 10 mm or less. When the maximum thickness is within the range indicated above, the advantageous effect tends to be better achieved.

Here, the temperature-responsive component is preferably an outer layer component as described above, more preferably a tread (cap tread)

Preferably, the tire includes at least one adjacent component that is adjacent to the temperature-responsive component and includes a material different from the elastomer composition, and the difference in hardness at 25° C. between the adjacent component and the temperature-responsive component is 15 or less.

The difference in hardness is more preferably 13 or less, still more preferably 10 or less, particularly preferably 8 or less, most preferably 5 or less, even most preferably 2 or less, further most preferably 0. When the difference is within the range indicated above, the advantageous effect tends to be better achieved.

The hardness at 25° C. of the temperature-responsive component is preferably 55 or higher, more preferably 60 or higher, but is preferably 80 or lower, more preferably 75 or lower. When the hardness is within the range indicated above, the advantageous effect tends to be better achieved.

Here, preferably, the temperature-responsive component is a tread (cap tread), and the adjacent component is a base tread.

Moreover, for example, the formulation of the adjacent component may be that of the elastomer composition from which the temperature-responsive resin is omitted.

Herein, the hardness refers to the JIS-A hardness measured in accordance with JIS K 6253-3 (2012) "Rubber, vulcanized or thermoplastic—Determination of hardness—Part 3: Durometer method" using a type A durometer.

EXAMPLES

The present disclosure is specifically described with reference to, but not limited to, examples.

The chemicals used in the following examples and comparative examples are listed below.

SBR: Nipol 1502 (E-SBR, styrene content: 23.5% by mass, vinyl content: lower than 20%) available from Zeon Corporation BR: BR150B (cis content: 98% by mass) available from Ube Industries, Ltd.

NR: TSR20 (natural rubber)

Carbon black: Seast N220 ($N_2SA$: 111 $m^2/g$, DBP: 115 ml/100 g) available from Mitsubishi Chemical Corporation Silica: ULTRASIL VN3 ($N_2SA$: 175 $m^2/g$) available from Evonik Degussa Silane coupling agent: Si266 (bis(3-triethoxysilylpropyl) disulfide) available from Evonik Degussa Wax: Ozoace wax available from Nippon Seiro Co., Ltd.

Antioxidant: NOCRAC 6C (N-(1,3-dimethylbutyl)-N'-phenyl-p-phenylenediamine) available from Ouchi Shinko Chemical Industrial Co., Ltd.

Oil: PS-32 available from Idemitsu Kosan Co., Ltd.

PNIPAM-b-Sty (1): a N-isopropylacrylamide-styrene diblock copolymer synthesized according to the polymerization method described in JP 2019-83761 A (Mw: 70,000, NIPAM:Sty=90:10 (% by mass))

PNIPAM-b-Sty (2): a N-isopropylacrylamide-styrene diblock copolymer synthesized according to the polymerization method described in JP 2019-83761 A (Mw: 50,000, NIPAM:Sty=70:30 (% by mass))

PNIPVM-b-Sty (1): a PNIPVM-styrene diblock copolymer synthesized according to the polymerization method described in JP 2019-83761 A (Mw: 70,000, NIPVM:Sty=90:10 (% by mass))

PNIPVM-b-Sty (2): a PNIPVM-styrene diblock copolymer synthesized according to the polymerization method described in JP 2019-83761 A (Mw: 50,000, NIPVM:Sty=70:30 (% by mass))

PNIPAM-b-AMS: a N-isopropylacrylamide-α-methylstyrene diblock copolymer synthesized according to the polymerization method described in JP 2019-83761 A (Mw: 70,000, NIPAM:AMS=90:10 (% by mass))

Epoxide/allyl glycidyl ether copolymer: the epoxide/allyl glycidyl ether copolymer described in Production Example 2 in WO 2020/022325

Cellulose fiber: biomass nanofiber (trade name "BiNFi-s cellulose", microfibrillated cellulose fiber) available from Sugino Machine Limited Stearic acid: stearic acid available from NOF Corporation Zinc oxide: zinc oxide #2 available from Mitsui Mining & Smelting Co., Ltd.

Sulfur: powdered sulfur available from Tsurumi Chemical Industry Co., Ltd.

Vulcanization accelerator: NOCCELER NS (N-tert-butyl-2-benzothiazolylsulfenamide) available from Ouchi Shinko Chemical Industrial Co., Ltd.

Examples and Comparative Examples

According to the formulation recipe shown in Table 2 or 3, the chemicals other than the sulfur and vulcanization accelerator were kneaded using a 1.7 L Banbury mixer (Kobe Steel, Ltd.) at 150° C. for 5 minutes to obtain a kneaded mixture. Then, the sulfur and vulcanization accelerator were added to the kneaded mixture, and they were kneaded in an open roll mill at 80° C. for 5 minutes to obtain an unvulcanized rubber composition.

The unvulcanized rubber composition was press-vulcanized at 170° C. for 12 minutes to prepare a 2 mm-thick vulcanized rubber composition sheet.

Separately, according to Table 4, the unvulcanized rubber composition prepared as above was formed into a cap tread shape and assembled with other tire components to build an unvulcanized tire. The unvulcanized tire was vulcanized at 170° C. for 15 minutes to prepare a test tire (size: 195/65R15).

Here, the formulation of a base tread rubber was that of Comparative Example 1, but the oil content and the filler content were adjusted as appropriate to change the hardness.

Moreover, the tire was prepared so that the base tread was adjacent to the cap tread in the tire radial direction.

The vulcanized rubber compositions and test tires prepared as above were stored at room temperature in the dark for 3 months and then subjected to the following evaluations. Tables 2 to 4 show the results.

(Measurement of Contact Angle of Water)

The contact angle of water on each 2 mm-thick vulcanized rubber composition sheet was measured.

Specifically, the 2 mm-thick vulcanized rubber composition sheet was kept at a measurement temperature for 10 minutes, and then a 20 μL water droplet was dropped on the surface of the sheet. Fifteen seconds later, the contact angle of the droplet was measured using a contact angle meter.

Here, the measurement was first carried out at a measurement temperature of 5° C. and then at a measurement temperature of 60° C. The measured results were taken as the first measurement results. After the first measurement, the measured vulcanized rubber composition sheet was immersed in water for one hour such that the measurement surface was in contact with water. After the immersion in water, the vulcanized rubber composition sheet was dried at 60° C. for 24 hours. Then, the dried vulcanized rubber composition sheet was cooled to room temperature. Thereafter, the second measurement was carried out at a measurement temperature of 5° C. and then at a measurement temperature of 60° C. The measured results were taken as the second measurement results. Tables 2 and 3 show the second measurement results.

(Rubber Hardness, Hs)

The hardness of rubber specimens cut out from the cap and base treads of each test tire was measured. Specifically, the hardness (JIS-A hardness) of the specimens was measured in accordance with JIS K 6253-3 (2012) "Rubber, vulcanized or thermoplastic—Determination of hardness—Part 3: Durometer method" using a type A durometer. The measurement was carried out at 25° C.

(Ice Grip Performance)

A set of the test tires were mounted on a front-engine, rear-wheel-drive car of 2000 cc displacement made in Japan. The car was driven on ice to evaluate the ice grip performance. Specifically, to evaluate the ice grip performance, the stopping distance (brake stopping distance on ice) required for the car traveling on ice to stop after the brakes that lock up were applied at 30 km/h was measured. The distances are expressed as an index (ice grip performance index) relative to that of Comparative Example 5 taken as 100. A higher index indicates better braking performance on ice (ice grip performance).

(Dry Grip Performance)

The test tire was mounted on each wheel of a car (a front-engine, front-wheel-drive car of 2000 cc displacement made in Japan). The braking distance of the car with an initial speed of 100 km/h on dry asphalt was determined. The distances are expressed as an index (dry grip performance index) relative to that of Comparative Example 5 taken as 100. A higher index indicates a shorter braking distance and better dry grip performance.

TABLE 2

| | | Example 1 | Example 2 | Example 3 | Example 4 | Example 5 | Example 6 |
|---|---|---|---|---|---|---|---|
| Amount | SBR | 60 | 60 | 60 | 60 | 60 | 60 |
| (parts | BR | 40 | 40 | 40 | 40 | 40 | 40 |
| by | NR | | | | | | |
| mass) | Carbon black | 5 | 5 | 5 | 5 | 5 | 5 |
| | Silica | 85 | 85 | 85 | 85 | 85 | 85 |
| | Silane coupling agent | 8 | 8 | 8 | 8 | 8 | 8 |
| | Wax | 1 | 1 | 1 | 1 | 1 | 1 |
| | Antioxidant | 2 | 2 | 2 | 2 | 2 | 2 |
| | Oil | 20 | 20 | 20 | 20 | 20 | 20 |
| | PNIPAM-b-Sty (1) | 10 | 20 | | | | |

TABLE 2-continued

| | | | | | | | |
|---|---|---|---|---|---|---|---|
| | PNIPAM-b-Sty (2) | | | 20 | | | 10 |
| | PNIPVM-b-Sty (1) | | | | 20 | | |
| | PNIPVM-b-Sty (2) | | | | | 20 | |
| | PNIPAM-b-AMS | | | | | | |
| | Stearic acid | 1 | 1 | 1 | 1 | 1 | 1 |
| | Zinc oxide | 1.5 | 1.5 | 1.5 | 1.5 | 1.5 | 1.5 |
| | Sulfur | 1 | 1 | 1 | 1 | 1 | 1 |
| | Vulcanization accelerator | 2 | 2 | 2 | 2 | 2 | 2 |
| Evaluation | Water contact angle [°] at 5° C. | 72 | 53 | 65 | 58 | 68 | 76 |
| | (Water contact angle at 5° C.)/ (Water contact angle at 60° C.) | 0.85 | 0.62 | 0.76 | 0.68 | 0.80 | 0.89 |

| | | Example 7 | Example 8 | Example 9 | Comparative Example 1 | Comparative Example 2 |
|---|---|---|---|---|---|---|
| Amount (parts by mass) | SBR | 60 | 60 | 60 | 60 | |
| | BR | 40 | 40 | 40 | 40 | |
| | NR | | | | | 100 |
| | Carbon black | 5 | 5 | 5 | 5 | 5 |
| | Silica | 85 | 85 | 85 | 85 | 85 |
| | Silane coupling agent | 8 | 8 | 8 | 8 | 8 |
| | Wax | 1 | 1 | 1 | 1 | 1 |
| | Antioxidant | 2 | 2 | 2 | 2 | 2 |
| | Oil | 20 | 20 | 20 | 20 | 20 |
| | PNIPAM-b-Sty (1) | 10 | 10 | | | 20 |
| | PNIPAM-b-Sty (2) | 5 | 10 | | | |
| | PNIPVM-b-Sty (1) | | | | | |
| | PNIPVM-b-Sty (2) | | | | | |
| | PNIPAM-b-AMS | | | 20 | | |
| | Stearic acid | 1 | 1 | 1 | 1 | 1 |
| | Zinc oxide | 1.5 | 1.5 | 1.5 | 1.5 | 1.5 |
| | Sulfur | 1 | 1 | 1 | 1 | 1 |
| | Vulcanization accelerator | 2 | 2 | 2 | 2 | 2 |
| Evaluation | Water contact angle [°] at 5° C. | 68 | 60 | 54 | 85 | 75 |
| | (Water contact angle at 5° C.)/ (Water contact angle at 60° C.) | 0.80 | 0.70 | 0.64 | 0.95 | 0.91 |

TABLE 3

| | | Example 10 | Comparative Example 3 | Example 11 | Comparative Example 4 |
|---|---|---|---|---|---|
| Amount (parts by mass) | SBR | 60 | 60 | 60 | 60 |
| | BR | 40 | 40 | 40 | 40 |
| | NR | | | | |
| | Carbon black | 5 | 5 | 5 | 5 |
| | Silica | 85 | 85 | 85 | 85 |
| | Silane coupling agent | 8 | 8 | 8 | 8 |
| | Wax | 1 | 1 | 1 | 1 |
| | Antioxidant | 2 | 2 | 2 | 2 |
| | Oil | 15 | 15 | 15 | 15 |
| | PNIPAM-b-Sty (1) | 20 | | 20 | |
| | Epoxide/allyl glycidyl ether copolymer | 10 | 10 | | |
| | Cellulose fiber | | | 10 | 10 |
| | Stearic acid | 1 | 1 | 1 | 1 |
| | Zinc oxide | 1.5 | 1.5 | 1.5 | 1.5 |
| | Sulfur | 1 | 1 | 1 | 1 |
| | Vulcanization accelerator | 2 | 2 | 2 | 2 |
| Evaluation | Water contact angle [°] at 5° C. | 52 | 80 | 51 | 82 |
| | (Water contact angle at 5° C.)/ (Water contact angle at 60° C.) | 0.65 | 0.98 | 0.62 | 0.97 |

TABLE 4

| | Example 12 | Example 13 | Example 14 | Example 15 | Example 16 | Comparative Example 5 |
|---|---|---|---|---|---|---|
| Cap tread composition | Example 2 | Example 2 | Example 2 | Example 2 | Example 2 | Comparative Example 1 |
| Maximum thickness [mm] of cap tread rubber | 0.5 | 1.5 | 1.5 | 1.5 | 2 | 0.5 |

TABLE 4-continued

| | | Example 12 | Example 13 | Example 14 | Example 15 | Example 16 | Comparative Example 5 |
|---|---|---|---|---|---|---|---|
| | Hardness (at 25° C.) of cap tread rubber | 68 | 68 | 68 | 68 | 68 | 66 |
| | Hardness (at 25° C.) of base tread rubber | 58 | 58 | 51 | 56 | 68 | 49 |
| | Difference in hardness | 10 | 10 | 17 | 12 | 0 | 17 |
| Evaluation | Ice grip performance | 115 | 120 | 116 | 118 | 130 | 100 |
| | Dry grip performance | 110 | 111 | 107 | 109 | 115 | 100 |

Tables 2 and 3 reveal the following. The elastomer compositions of Examples contain a styrene-based elastomer and a temperature-responsive resin that changes its hydrophilicity with changes in temperature, and also satisfy the following relationship at two given temperatures differing by at least 10° C.: (Contact angle at lower temperature)/(Contact angle at higher temperature)≤0.90, in which the lower temperature is lower than 25° C. These elastomer compositions are capable of changing tire performance in response to changes in temperature as temperature changes may change the hydrophilicity (contact angle) to change the compatibility with other components in the composition.

Table 4 also shows that the tires of Examples have excellent overall performance in terms of ice grip performance and dry grip performance (as expressed by the sum of the two indices of ice grip performance and dry grip performance).

Moreover, comparisons between Comparative Example 2 and Examples suggest that as the styrene-based elastomer is more lipophilic than natural rubber and is more compatible with a material having a LCST at temperatures higher than the LCST but is more incompatible with the material at temperatures lower than the LCST, it facilitates changes in tire performance between low and high temperatures.

Exemplary embodiments of the present disclosure include:

Embodiment 1. An elastomer composition, containing:

a styrene-based elastomer; and a temperature-responsive resin that changes its hydrophilicity with changes in temperature, the elastomer composition satisfying the following relationship at two given temperatures differing by at least 10° C.:

(Contact angle at lower temperature)/(Contact angle at higher temperature)≤0.90 the lower temperature being lower than 25° C.

Embodiment 2. The elastomer composition according to Embodiment 1, wherein the elastomer composition satisfies the following relationship at the two given temperatures differing by at least 10° C.:

(Contact angle at lower temperature)/(Contact angle at higher temperature)≤0.85.

Embodiment 3. The elastomer composition according to Embodiment 1, wherein the elastomer composition satisfies the following relationship at the two given temperatures differing by at least 10° C.:

(Contact angle at lower temperature)/(Contact angle at higher temperature)≤0.80.

Embodiment 4. The elastomer composition according to any one of Embodiments 1 to 3, wherein the elastomer composition satisfies the following relationship at the two given temperatures differing by at least 10° C.:

(Contact angle at lower temperature)/(Contact angle at higher temperature)≥0.30.

Embodiment 5. The elastomer composition according to any one of Embodiments 1 to 3, wherein the elastomer composition satisfies the following relationship at the two given temperatures differing by at least 10° C.:

(Contact angle at lower temperature)/(Contact angle at higher temperature)≥0.40.

Embodiment 6. The elastomer composition according to any one of Embodiments 1 to 5, wherein the temperature-responsive resin is a compound including "A" and "B" bound to each other, "A" contains a group that changes its hydrophilicity with changes in temperature, and "B" includes at least one selected from the group consisting of terpene resins, rosin resins, styrene resins, C5 resins, C9 resins, C5/C9 resins, coumarone resins, indene resins, and olefin resins.

Embodiment 7. The elastomer composition according to Embodiment 6, wherein the group shows a lower critical solution temperature in water.

Embodiment 8. The elastomer composition according to any one of Embodiments 1 to 7, wherein the temperature-responsive resin is a block copolymer.

Embodiment 9. The elastomer composition according to Embodiment 6, wherein a ratio (% by mass) of "A" to "B" in the temperature-responsive resin is 50:50 to 98:2.

Embodiment 10. The elastomer composition according to any one of Embodiments 1 to 9, wherein the temperature-responsive resin has a weight average molecular weight of at least 500 but not more than 80,000.

Embodiment 11. The elastomer composition according to any one of Embodiments 1 to 10, wherein the elastomer composition further contains at least one of water absorbent fibers, elastomers, or resins.

Embodiment 12. A tire, including a temperature-responsive component including the elastomer composition according to any one of Embodiments 1 to 11, the temperature-responsive component having a maximum thickness of 1 mm or more.

Embodiment 13. The tire according to Embodiment 12, wherein the temperature-responsive component is an outer layer component of the tire.

Embodiment 14. The tire according to Embodiment 12 or 13, wherein the tire includes at least one adjacent component that is adjacent to the temperature-responsive component and includes a material different from the elastomer composition, and a difference in hardness at 25° C. between the adjacent component and the temperature-responsive component is 15 or less.

The invention claimed is:

1. A tire comprising a temperature-responsive component comprising an elastomer composition comprising:

an elastomer component comprising a styrene-based elastomer; and a temperature-responsive resin that changes its hydrophilicity with changes in temperature, the elastomer composition satisfying the following relationship at two given temperatures differing by at least 10° C.:

$$0.5 \leq (\text{Contact angle at lower temperature})/(\text{Contact angle at higher temperature}) \leq 0.90,$$

the lower temperature being lower than 5° C., the temperature-responsive component having a maximum thickness of 1 mm or more, the temperature-responsive resin is a block copolymer, and the amount of the temperature-responsive resin is 20 to 60 parts by mass per 100 parts by mass of the elastomer component, wherein the tire comprises at least one adjacent component that is adjacent to the temperature-responsive component and comprises a material different from the elastomer composition, a difference in hardness at 25° C. between the adjacent component and the temperature-responsive component is 2 or less, and wherein the temperature-responsive resin is a compound comprising "A" and "B" bound to each other, "A" comprises a polymer that changes its hydrophilicity with changes in temperature, "B" comprises at least one selected from the group consisting of terpene resins, rosin resins, C5 resins, C9 resins, C5/C9 resins, coumarone resins, indene resins, and olefin resins, and wherein the elastomer component has an SBR content of 70 mass % or less and a BR content of 30 mass % or more, each based on 100 mass % of the elastomer component.

2. The tire according to claim 1, wherein the temperature-responsive component is an outer layer component of the tire.

3. The tire according to claim 2, wherein the elastomer composition satisfies the following relationship at the two given temperatures differing by at least 10° C.:

$$0.5 \leq (\text{Contact angle at lower temperature})/(\text{Contact angle at higher temperature}) \leq 0.85.$$

4. The tire according to claim 3, wherein the elastomer composition satisfies the following relationship at the two given temperatures differing by at least 10° C.:

$$0.5 \leq (\text{Contact angle at lower temperature})/(\text{Contact angle at higher temperature}) \leq 0.80.$$

5. The tire according to claim 4, wherein the polymer shows a lower critical solution temperature in water.

6. The tire according to claim 5, wherein a ratio (% by mass) of "A" to "B" in the temperature-responsive resin is 50:50 to 98:2.

7. The tire according to claim 6, wherein the temperature-responsive resin has a weight average molecular weight of at least 500 but not more than 80,000.

8. The tire according to claim 7, wherein the elastomer composition further comprises at least one of water absorbent fibers, elastomers, or resins.

* * * * *